(No Model.)
J. L. WESLEY.
CORN AND SILK SEPARATOR.
No. 405,634. Patented June 18, 1889.
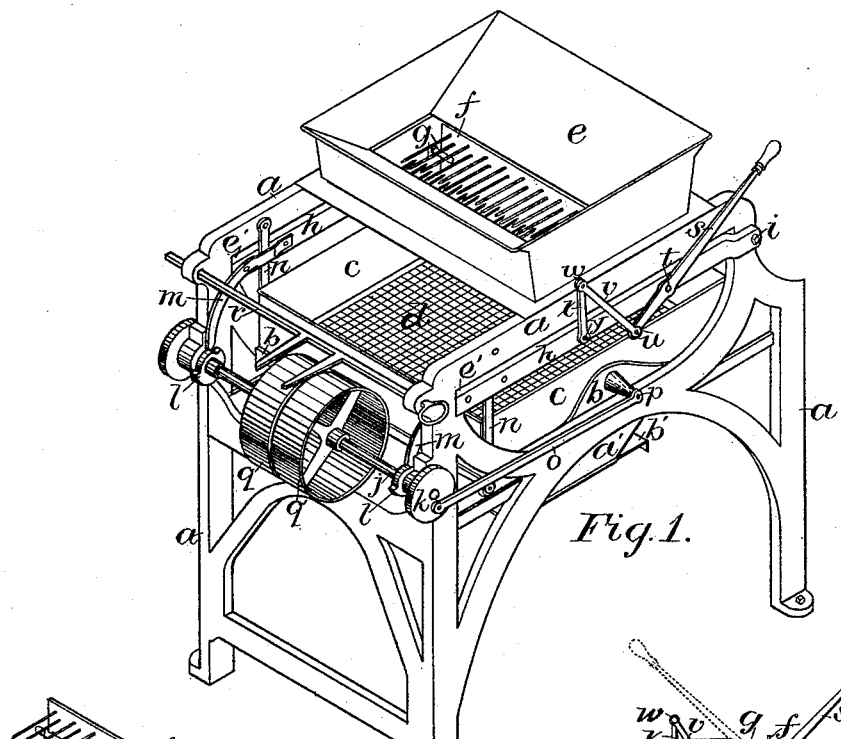
Fig. 1.
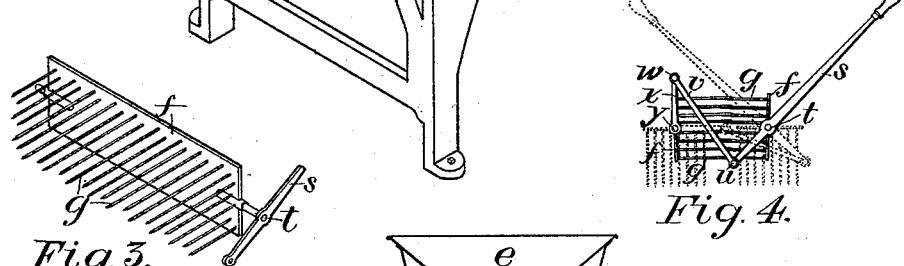
Fig. 3. Fig. 4.
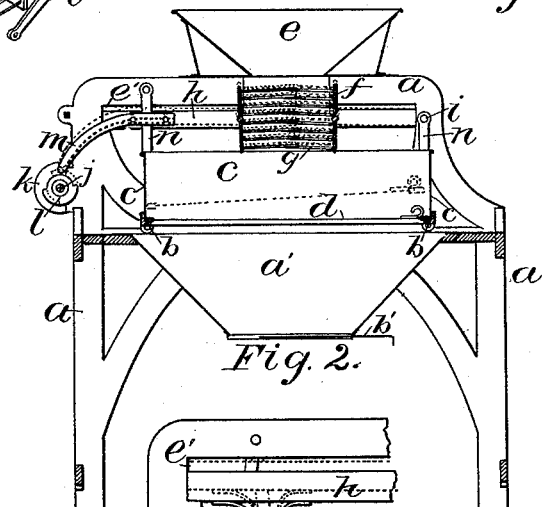
Fig. 2.
Fig. 5.
Witnesses
W. L. Perham.
Joseph B. Reed.
Inventor
John L. Wesley.
per atty.
Elym C. Verrill.

UNITED STATES PATENT OFFICE.

JOHN L. WESLEY, OF PORTLAND, MAINE.

CORN AND SILK SEPARATOR.

SPECIFICATION forming part of Letters Patent No. 405,634, dated June 18, 1889.

Application filed March 18, 1889. Serial No. 303,656. (No model.)

*To all whom it may concern:*

Be it known that I, JOHN L. WESLEY, of Portland, in the county of Cumberland and State of Maine, have invented certain new and useful Improvements in Corn and Silk Separators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in corn and silk separators, and is designed especially to prevent the clogging of the sieve by the silk; and it consists in interposing between a hopper and a sieve combs through which the corn passes before it falls upon the sieve, said combs being journaled in a jolting-frame, cams on the power-shaft, or other means for imparting a jolting movement to the said frame, a swinging sieve-pan placed beneath the said combs, and a pitman connecting said sieve-pan and a disk on the power-shaft for imparting a swinging movement to the sieve-pan; also, in levers for dumping the combs to remove the accumulated silk, and in a sieve adapted to fit the bottom of the swinging sieve-pan, said sieve being removable.

In the drawings herewith accompanying, Figure 1 is an isometric projection of my improved silker; Fig. 2, a longitudinal vertical section; Fig. 3, a detail showing comb; Fig. 4, a detail showing arragement of dumping-levers; and Fig. 5 a detail, with parts broken away, showing a different method of jolting the combs.

Same letters refer to like parts in all the figures.

In the drawings, $a$ represents the frame, to which the working parts of the machine are attached. It should be made of firm durable material. Attached to the frame $a$ by pivoted hangers or supporters $n$ is a jolting-frame $b$, adapted to support and carry a pan $c$, said frame and pan $c$ being suspended within the frame $a$. In the bottom of pan $c$ is a removable sieve $d$, said sieve $d$ forming the bottom of the pan. At one end of frame $a$ is a shaft $j$, having on its ends the crank-disks $k$, and near its longitudinal center band-wheels $q\ q'$, one fixed, the other loose. In the sides of the pan-frame $b$ are rods or projections $p$, which are connected with the crank-disks $k$ by a pitman $o$. If the pan is strong enough, the frame $b$ may be dispensed with and the projections $p$ extend out from the sides of the pan, and the hangers $n$ may then be attached to the side of the pan.

To the supporting-frame $a$ of the machine, at a convenient elevation, as at $i$, are pivoted the bars $h$, which form the jolting-frame. The other ends of said bars rest in the indent $e'$, cut in the opposite end of frame $a$, said indents being somewhat wider than the width of the said bars, so that the ends of the bars, being loose, may play up and down therein.

Journaled in the jolting-bars $h$ are comb-plates $f$, so placed that the teeth reach toward each other, the comb-plates extending upward to a hopper $e$ set on top of the frame $a$, hopper and said combs being directly over the sieve-pan. The comb-plates have teeth $g$, which together should extend entirely across the opening in the hopper, and the teeth of one comb may overlap those of the other, if desired.

The jolting-bars $h$ have on their free ends the projecting arms $m$, rigidly attached thereto, said arms extending forward until they impinge on the cams $l$, rigidly set on shaft $j$, each revolution of the cams raising the bars and allowing them to fall back again. Instead of the arms $m$ and cams $l$, the hangers $n$ may have studs or projections $c'$ and the bars $h$, the downwardly-curved plates $d'$ so placed that the projections on the hangers will strike against said curved plate as the pan swings back and forth, thus alternately raising the jolting-bars and allowing them to drop, as illustrated in Fig. 5.

The combs journaled in the jolting-bars $h$ and extending upwardly to the hopper, as described, are dumped or turned down to the position shown by dotted lines in Fig. 4, by means of levers $s$ and $x$, rigidly set on journals $t$ and $y$, respectively, the ends of said levers being connected by a link $v$, as shown in Fig. 1 and in detail in Fig. 4. From the arrangement of levers $s$ and $x$, as shown in Fig. 4, it is evident that when the lever $s$ is turned back to the position indicated by the dotted lines the comb-plates and teeth are turned down to the vertical position indicated by dotted lines. It is also evident that each comb-plate might have an independent lever, as if the link $v$ were omitted.

The operation of my improved machine is as follows: The corn, just as it is cut from the cob, is placed in the hopper $e$ and upon the teeth of the combs. The power-shaft is made to revolve by means of a band or pulley wheel $q$. The cams striking against the arms $m$, or the projections $c'$ striking against the inclined plates $d'$, impart a rapid jolting motion to the bars $h$, and consequently to the teeth on the combs. This causes the corn to work down between the teeth of the combs, the silk being caught and held by said teeth. The corn falls into the pan $c$ upon the sieve $d$. This pan, with its removable sieve-bottom, is moved rapidly backward and forward by means of the pitman $o$, connecting said pan or pan-frame with the crank-disks. Any small solid parts which have fallen between the comb-teeth are caught by the sieve, while the clean corn falls down into the chute or under hopper $a'$, and may be drawn off through a hole in the bottom. The bottom may have a slide or door $b'$ therein.

When the teeth of the combs become clogged, they may be turned downward and the accumulated silk dumped upon the sieve by means of the levers $s$ and $x$. The removable sieve may then be removed, cleansed, replaced, and the combing and sifting operation continued.

Having thus described my invention and its use, what I claim, and desire to secure by Letters Patent of the United States, is—

1. In a corn and silk separator having a suitable supporting-frame, the combination, with a sieve-pan attached to said frame by pivoted hangers, a power-shaft having band-wheel and crank-disks on its ends, and crank-shaft connecting said pan with said disks, of jolting-bars pivoted to the frame, combs journaled in the jolting-bars, and a hopper, substantially as and for the purposes set forth.

2. In a corn and silk separator having a suitable supporting-frame, the combination, with a sieve-pan attached to the frame by pivoted hangers, a power-shaft with band-wheel and crank-disks, and shaft connecting said disks and said pan, of jolting-bars pivoted to the frame, combs journaled in the jolting-bars over the pan, a hopper, projections on the hangers, and downwardly-curved plates attached to the jolting-bars, substantially as set forth.

3. In a corn and silk separator having a suitable supporting-frame, the combination, with a swinging sieve-pan, as described, jolting-bars pivoted to the frame, combs journaled in the jolting-bars, and a hopper, of levers rigidly attached to the comb-journals, a link connecting the ends of said levers for dumping the combs, as set forth.

4. In combination, a swinging sieve, combs located above said sieve for collecting the silk and capable of being dumped, mechanism for imparting a jolting motion to said combs, and levers for operating the combs to clear the teeth of the accumulated silk, as set forth.

In testimony that I claim the foregoing as my own I affix my signature in presence of two witnesses.

JOHN L. WESLEY.

Witnesses:
ELIJAH G. FIELDS,
ELGIN C. VERRILL.